(12) United States Patent
Eckhardt

(10) Patent No.: US 10,078,417 B1
(45) Date of Patent: Sep. 18, 2018

(54) VIEW PORT ARRAY OF GRAPHIC USER INTERFACE COMPONENTS

(71) Applicant: Freedom Scientific, Inc., St. Petersburg, FL (US)

(72) Inventor: Jost Eckhardt, Burlington, VT (US)

(73) Assignee: Freedom Scientific, Inc., St. Petersburg, FL (US)

(*) Notice: Subject to any disclaimer, the term of this patent is extended or adjusted under 35 U.S.C. 154(b) by 45 days.

(21) Appl. No.: 15/223,194

(22) Filed: Jul. 29, 2016

(51) Int. Cl.
*G06F 3/048* (2013.01)
*G06F 3/0481* (2013.01)
*G06F 3/0484* (2013.01)

(52) U.S. Cl.
CPC ........ *G06F 3/04812* (2013.01); *G06F 3/0481* (2013.01); *G06F 3/04847* (2013.01); *G06F 2203/04806* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 7,689,926 B2 | 3/2010 | de Souza et al. | |
| 7,900,158 B2 | 3/2011 | Ngari et al. | |
| 7,912,322 B2 | 3/2011 | Weiss et al. | |
| 8,280,193 B2 | 10/2012 | Weiss et al. | |
| 8,869,062 B1 | 10/2014 | Voorhees et al. | |
| 2005/0285880 A1 | 12/2005 | Lai et al. | |
| 2007/0268317 A1 | 11/2007 | Banay | |
| 2008/0259039 A1* | 10/2008 | Kocienda | G06F 3/0238 345/173 |
| 2010/0302236 A1* | 12/2010 | Kinnan | G06T 15/30 345/419 |
| 2010/0313125 A1* | 12/2010 | Fleizach | G06F 3/04883 345/173 |
| 2014/0129956 A1* | 5/2014 | Hunleth | G06F 3/0484 715/746 |
| 2014/0245209 A1* | 8/2014 | Wang | G06F 3/0481 715/771 |
| 2015/0033183 A1 | 1/2015 | Voorhees et al. | |

* cited by examiner

*Primary Examiner* — Xuyang Xia
(74) *Attorney, Agent, or Firm* — Andriy Lytvyn; Anton J. Hopen; Smith & Hopen, P.A.

(57) ABSTRACT

A screen magnification software feature that listens to internal messages within an operating system and automatically detects an input control coming into focus and sets a primary magnified view port on that input control. As an end user interacts with the input control the software further listens for operating system messaging indicating a change in an output region responsive to the interaction with the input control. Upon detecting this output region change, a secondary magnified view port is displays simultaneously with the primary magnified view port on a graphic user interface, the focus staying within the primary magnified view port. The end user has magnified views of both the control she is interacting with (e.g., a virtual calculator keypad of buttons) in the primary view port and the output region (e.g., a text box showing the calculated result) in the secondary view port.

25 Claims, 12 Drawing Sheets

VIEW PORT ARRAY OF GRAPHIC USER INTERFACE COMPONENTS

BACKGROUND OF THE INVENTION

Field of the Invention

This invention relates to screen magnification. More specifically, it relates to automatically generating a plurality of screen magnification view ports based on tracking the focus from a first control to a second control on a graphic user interface (GUI).

BRIEF DESCRIPTION OF THE RELATED ART

Screen magnifier applications are software programs that execute on top of an operating system to enlarge areas of the screen for the primary benefit of low vision users. Programs displayed on the GUI usually include controls which are components that user interacts with and/or displays output to the user. Examples of components include textboxes, radio button dialogs, scrollbars, checkboxes, panels, text labels, image buttons, and the like.

Software applications are often written without consideration to a low vision user and particularly one using screen magnification software. Without magnification, a user can view the entire screen area of a graphic user interface. However, inherently only a portion of the GUI may be magnified at one time. The boundaries of the magnified area are defined by a view port which is typically a rectangular area of the GUI which is magnified to full-screen. Therefore, there are portions of the GUI that are not visible to the user while magnification is on. If all the end user interaction with the software application is positioned within a small area of the GUI then the magnification software can set a view port to that area and the low vision user can work efficiently.

However, many software applications do not congregate the user input controls and output together in one area. This becomes a significant problem for the low vision user. They may interact with one side of the GUI in a magnified view but the output, results or next component they need is at another location outside the view port of the magnification. They must then hunt down that new location and reset the magnification view port to that location. For repetitive, productivity applications this situation may create a significant disadvantage to the low vision user's productivity. By way of example, a low vision user working in a spreadsheet application may enter a formula in a text field at the top of the spreadsheet interface but want to see the calculated result in an individual cell at the bottom of the interface. In this example, the low vision user would have to switch back and forth.

What is needed in the art is a magnification software application and method to automatically modify the GUI screen output so that components and output from different locations in the GUI may be viewed simultaneously by the end user.

However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a multi-view port screen magnifier is now met by a new, useful, and nonobvious invention.

The present invention is a productivity feature for screen magnification software. When enabled, the feature is automatically engaged if the focus moves to a supported control. The screen is split into two view ports with the primary view port displaying the focused control and the secondary view port displaying an output region for this control. For example, if the focus moves in a search edit box, this edit box is displayed in the primary view port and the best matching search result is displayed in the secondary view port. This eliminates the need to scroll the view port between the input and the output areas thus increasing the productivity. The table below shows some illustrative input controls (primary view port) and corresponding output regions (secondary view port).

TABLE 1

| Input Control | Output Region |
| --- | --- |
| Windows 10 Cortana search edit box | best match |
| Windows 7 start menu search | results |
| Word 2013 search dialog | search results |
| Word 2016 search dialog | search results |
| Outlook 2013 search dialog | search results |
| Outlook 2016 search dialog | search results |
| Excel 2013 search dialog | search results |
| Excel 2016 search dialog | search results |
| IE11 search dialog | search results |
| Firefox search dialog | search results |
| Google Chrome search dialog | search results |
| Word 2013 spell check controls | misspelled text in the document |
| Word 2016 spell check controls | misspelled text in the document |
| Outlook 2013 spell check controls | misspelled text in the document |
| Outlook 2016 spell check controls | misspelled text in the document |
| Excel 2013 active cell | formula bar |
| Excel 2016 active cell | formula bar |
| Windows 10 on screen keyboard | window receiving the text input |
| Windows 10 calculator input buttons | calculator result field |
| Windows 7 calculator input buttons | calculator result field |
| Skype input field | Skype message log |
| Outlook 2013 inbox | preview window |
| Outlook 2016 inbox | preview window |

Implemented as a method, the present invention automatically presents magnified view ports of an in-focus input control and a responsive output region or component on a graphic user interface that is presented on a display monitor. The steps of the method include intercepting messaging from an operating system indicating the input control has focus. This may be achieved by hooking into the messaging of the operating system itself or using an assistive technology API such as MICROSOFT UIA or MSAA. In one embodiment of the invention, a rules engine contains a data store of specific input controls to look for according to the specific software application that displays them on a GUI. The data store may also contain the identities of the output controls, components or regions on the GUI that change responsive to interaction with the input control.

In an alternative embodiment of the invention, the magnification software looks for any generic input control or component then monitors events made by end user interaction with that control and obtains information on other controls effected by it. For example, typing into a text box causes a list box to change state. This embodiment of the invention dynamically creates the association between the input control and the output control by intelligently monitoring changes in state.

The next step includes displaying on the monitor a primary view port of the area of the input control at a first magnification level whereby an end user may interact with the input control. The primary view port may initially fill the entire monitor or may be limited to a segment of the GUI's total canvas area. Next, the method intercepts messaging from the operating system indicating the output region has changed responsive to end user interaction with the input control. Finally, the method displays on the monitor a secondary view port of the output region. When the relationship between the input control and output area or control is known ahead of time both the primary and secondary view ports may be automatically displayed simultaneously upon focusing arriving on the input control.

The end user may initially desire the primary view port cover the entire display. When the end user interacts with the input control and thus changes the output region or output control state, a helpful visual indicator is to introduce the secondary view port by animation such as a fade in, slide-in or other visual effect. The secondary view port may temporarily overlap the primary view port responsive to the change of the output region responsive to end user interaction with the input control.

Mouse-pointer movements are monitored within the primary view port and responsive to the mouse-pointer location moving a predetermined distance away from the input control, the primary and secondary view ports are closed and the magnification software automatically exits the dual view mode. In an embodiment of the invention, the size of the primary view port is reduced responsive to the display of the secondary view port whereby both view ports are simultaneously visible on the display monitor. The invention includes logic to determine whether the relevant controls may be displayed in the primary viewport or whether the secondary viewport is necessary. This is achieved by retrieving from the operating system the current resolution of a computer monitor displaying the graphic user interface, calculating under the first magnification level whether the input control and output region are fully visible within the primary view port and finally displaying the secondary view port only if both the input control and output region are too large or too distant on the graphic user interface to be displayed together within the primary view port.

Low vision users operating magnification software frequently change magnification levels. An embodiment of the invention acts responsive to an increase of magnification level by the end user while displaying both the input control and output region within the primary view port. Should the increased magnification level exceed the ability to display the input control and output region simultaneously within the primary view port the application displays the input control in the primary view port and displays the output region in the secondary view port.

By the same token, an end user may decrease magnification while displaying the input control in the primary view port and the output region within the secondary view port. The invention monitors the dimensions of the input control area and output control area whereby, if possible, the secondary view port is closed and the input control and output region are displayed together in the primary view port.

A rules engine directs operation of the screen magnification feature of this invention by creating an array of input control and output region rules, each rule is assigned to a software application and at least one input control and at least one output region. The magnification software generally loads itself into memory upon boot up of the operating system software and the primary viewport is enabled. At 1× magnification there is little difference between the GUI appears with or without the magnification software in memory. The magnification software monitors operating system events fired responsive to a software application putting focus on at least one input control found in the rule.

The magnification software then automatically launches a secondary view port for the output region either immediately or upon output being detected (e.g., a change in text). The magnification software further monitors operating system events for when focus is lost from the input control and automatically removes the secondary view port responsive to loss of focus of the input control. For clarity, it should be noted that the present invention can be considered a new "mode" of magnification software (referred herein as "SDV mode"). The trigger for SDV mode is focus upon a predetermined input control and the response is displaying the secondary viewport by automatically splitting the screen into two (or more) view ports. SDV mode typically exits when end user interaction removes focus from the input control such as tabbing to a new control or moving the mouse pointer beyond a distance from the input control. Exiting SDV mode automatically closes or hides the secondary view port.

The positioning of the secondary view port may be determined by the analogous coordinate relationship of the output area or output control with respect to the input control. For example, left-right, top-bottom and the like. In an embodiment of the invention, a special keyboard command operates to pan only the secondary view port wherein the output region is displayed. Otherwise, focus stays within the primary view port.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
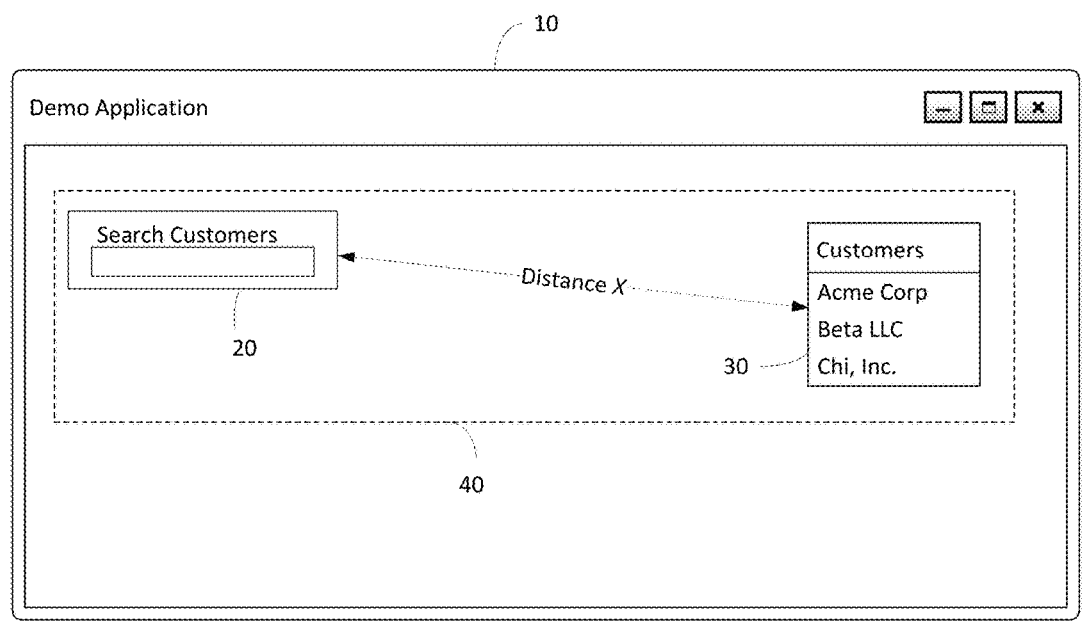
FIG. 1 is a conceptual view of an unmagnified desktop graphic user interface showing an input component and output region.

Working in the MICROSOFT WINDOWS brand operating system and WINDOWS applications users will encounter situations where two or more objects need to be viewed at the same time. Examples include:
1) Search edit box and found location;
2) Spell check controls and misspelled text in the document;
3) The cell in a spreadsheet and the information about the formula behind it;
4) On screen keyboard and the window receiving the text input;
5) Calculator input buttons and calculator result field;
6) Skype input field and Skype message log;
7) Quick Books customer list, customer information and transactions; and
8) Email inbox and preview window.

In the unmagnified view it is easy to look at the one and then the other locations. If the objects are close to each other that might also work at lower magnification levels, but if the objects are distant from each other even an end user at 2× magnification has a clear disadvantage. To look at all locations, the user will need to scroll the magnified view from one to the other object and back. The first object is typically an input object that the user interacts with and that manipulates the output of the other objects, which are the related objects.

To solve the disadvantage of needing to scroll between multiple distant locations, the magnification software needs to be able to identify the situation and to locate the related objects. One possible implementation is a rules engine, that is triggered by focus and similar events. If the focus is changed, the engine looks for a matching object (for example, search edit control) within the rule set. If a matching object is found, the engine looks for related objects (for example, found text location).

The rules engine needs to be triggered on all events that are manipulating the location or size of the related objects. The monitoring of events is dependent on the type of the input and output objects. It might include state change events and text change events. With the location of all objects known, the support to view all needs to take the magnification level into consideration. At no magnification or very low magnification and as long as both objects are displayed within the same magnified view, maybe only an enhancement (for example a frame) should be rendered around the related objects (for example, found text).

At medium magnification level, when all objects are no longer simultaneous visible within the magnified view, secondary view ports should be used to display the related objects (found text) alongside with the first object (search edit control). Since input can only be directed to one view port at the same time a method is provided to toggle which object is displayed in the main (active) view port and which in the secondary (inactive) view port. This method may be a gesture, key combination or the like.

At high magnification level, when all objects can't simultaneous display on the screen, a command is provided to toggle between the two objects showing one at a time. The rules engine, in its simplest form, is implemented as a static set of rules. In a more advanced implementation the user adds rules by engaging a configuration mechanism and pointing to the first and then the related objects.

The related objects are displayed the same way as they would be magnified if the user would scroll to them. The only addition is to render a visual frame around them to notify the user that this object is only viewed here at the screen, but it is really located at another place.

An alternative is to make the dislocated situation very obvious to the user is by newly rendering the related objects within the secondary viewports. The background color, foreground color and font may be user selectable and the content of the related objects would be rendered using these choices. The initial display of the secondary view ports uses animation to reduce the potential confusion of the end user seeing several distant objects at the same time. Possible animations include slide in, zoom up, fade in, etc.

Intercepting Operating System Messages

The MICROSOFT WINDOWS operating system passes input to a window procedure in the form of a message. Messages are generated by both the system and applications. The system generates a message at each input event, for example, when the user types, moves the mouse, or clicks a control such as a scroll bar. The system also generates messages in response to changes in the system brought about by an application, such as when an application changes the pool of system font resources or resizes one of its windows. An application can generate messages to direct its own windows to perform tasks or to communicate with windows in other applications. Focus events are fired whenever a component gains or loses the focus. This is true whether the change in focus occurs through the mouse, the keyboard, or programmatically.

The present invention is a screen magnification software application that no only magnifies selected areas of a graphic user interface (among many other features to aid low-vision users) but listens to messages passed between the operating system and applications to determine if a component has focus (e.g., is active and accepting end user input).

Secondary View Port Features

In a first embodiment of the invention, the secondary view port has only a single data source. The secondary view port is displayed using the magnification settings of the primary view port. The secondary view port is displayed above or below the input controls depending on the relative locations of input and output regions. The secondary view port does not take more than half the screen in one embodiment. The secondary view port can optionally slide in from the top (or the bottom). The secondary view port can optionally fade in and out. The secondary view port may have a visible border separating it from the primary view port. An end user may scroll the content of the secondary view port without making it active.

When to Display a Secondary View Port

The secondary view port may be displayed when a supported scenario is focused. If a secondary view port is displayed in that scenario, it depends on two boundary conditions:

1) If input control and output region are fully visible within a single view port, the secondary view port is not needed. This is typically the case for lower magnification levels. Optionally, the secondary view port is displayed even in lower magnification levels.
2) If two view ports holding input control and output region can't be displayed without overlapping, the secondary view port is not displayed. This is typically the case for high magnification levels.

The calculation if the secondary view port should be displayed or not is based on the biggest text in any of the input controls and the average size of text in the output control. The calculation if the secondary view port should be displayed or not is further based on the maximum distance between any of the input controls and any possible output object/text. All these calculations are performed by the rules engine that steers the decisions for the feature. If the secondary view port is not displayed a visual, audio or tactile indication is displayed to notify the end user about the scenario.

Initial Display

When the user enters a scenario that requires the secondary view port, the secondary view port may slide into view. As the primary view port is now reduced in size, it may be necessary to adjust the content of the primary view port to make sure the input control is fully visible. This may be done by sliding in synchronization with the secondary view port.

Change in Magnification Level

If the secondary view port is not displayed and the user increases the magnification level to a point where it is necessary to display the secondary view port, the secondary view port will slide into view. If the secondary view port is displayed and the user increases the magnification level to a point where the secondary view port can no longer be displayed, the secondary view port should slide out of view. If the secondary view port is displayed and the user decreases the magnification level to a point where the secondary view port is no longer needed, the secondary view port should slide out of view.

Variable Output Locations

If the location of the output is variable, for example in the case of a MICROSOFT WORD text search, the visibility of the view port should be determined by the possible outermost location of the output region. This is to avoid sliding in and out of the secondary view port as the user steps through the search results. The content of the secondary view port is changing in this scenario not its location, size or magnification level. Even if the source location is changing, the secondary view port should not slide out of view.

Focus Tracking

If the focus is moved into the group of input controls that define a Smart Dual View (SDV) scenario, the SDV mode is entered. If the focus is moved within the controls that belong to the input area (search edit box, search button etc.), the primary view port is tracking the focus and SDV mode stays active. If the focus is moved outside of the group of input controls, the SDV mode is exited.

Mouse Tracking in SDV Mode

If the mouse is moved within the bounding region of the input controls, the primary view port is tracking the mouse and SDV mode stays active. If the mouse is moved outside of the bounding region of the input controls, SDV mode slowly exits. Depending how far the mouse moves away the more the secondary view port slides out and eventually disappears. The secondary view port will reappear as the mouse is moved back to the bounding region of the input controls. If the secondary view port is displayed and the mouse is moved into the area it displays, the secondary view port slides out faster to reduce double display of the same object.

Alt+CAPSLOCK+Arrow Keys

The pan view port commands may be configured to pan the secondary and not the primary view port.

Touch Support

The content of the inactive view port can be scrolled independent of the active view port, depending which area the 3-fingers are in ("first finger down" rule). If the secondary view port is not displayed at high magnification level, a new swipe command toggles between input and output location.

Center Alignment

In case of center alignment one option is to never display the secondary view port and instead use a hotkey to temporary show the output results.

Program Echo

An option is provided to announce the changes in the output region, for example, the sentence containing the misspelled word. There exists is further option to control the program echo for input control. If both are turned on, one might interrupt the other. For example, typing echo in the edit control might get interrupted by the output of the search result. Command "Say output text" (e.g., a keystroke combination) announces the text in the output region.

Zoom Windows

In single monitor mode the feature works for Full Zoom Window type. If the user runs split, docked, lens or line the feature is not available and greyed out. In multi monitor mode the feature works for any clone (mirror, 1×) and independent views (local and global).

Exiting SDV Mode

The secondary view port slides away if it had been displayed and indicators turn off.

Commands

The following commands shall be provided: "Toggle Smart Dual View" (default: Ctrl+Shift+2). If secondary view port is displayed it becomes hidden, the system announces "Smart Dual View off." If secondary view port is hidden and then it becomes visible, the system announces "Smart Dual View enabled." If only one view port can be displayed, this command toggles between displaying the input and the output region.

To invoke the state to "temporarily display output" a keystroke command is performed (e.g. hold ctrl+shift for 1 second). If the secondary view port is not displayed, it becomes visible until the keys are released.

ADDITIONAL EMBODIMENTS

The secondary view port may be implemented as a freeze window. It is acceptable to cover some desktop space as the secondary view port is automatically removed once moving the mouse or focus out of the input controls boundaries. A freeze window would have advantages for displaying a smaller size secondary view port at low magnification levels.

The rules engine may consume all events that come into the system. Some events might only be generated for the rules engine. As soon as the input controls get focus, it would go into the SDV state. A bounding rectangle is provided for the input control group. An exit event is fired once the focus moves out of the input controls. Events are fired when the output results initially show up and when the results change. A bounding rectangle is provided for all possible locations of output results.

An alternative embodiment of the invention allows for more than one output region. For example, a QUICK-BOOKS customer list has customer information and transactions when moving in the customer list box. An embodiment may allow for more than one input control. For example, an on-screen keyboard has the keys and predictions/suggestions to generate input to the edit control in the foreground application. An embodiment may provide an option to render the output content using a specified font, text and background color. Another embodiment may allow an end user to setup more Smart Dual Views areas by clicking on the input and the output areas. This would most likely be for static output locations. An embodiment of the invention may provide on screen controls to toggle between input and output controls in high magnification levels where both can't be displayed simultaneously. Yet another embodiment provides an option to render enhancements around input and output regions at low magnification levels. And finally, another embodiment allows an end user to display the secondary view port on a second monitor in a multi monitor setup.

Turning now to FIG. 1, a conceptual software application interface is displayed entitled "Demo Application." For the sake of this specification, we assume the unmagnified dialog box defining screen rectangle 10 is in a maximized state thereby filling the entire area of the end user's display monitor. For example, a 1080p display monitor will show 1920 pixels horizontally and 1080 pixels vertically. A 720p display monitor will display 1280 pixels horizontally and 720 pixels vertically. The figures used in this application are conceptual and do not necessarily correspond to the aspect ratio of any particular display specification. In FIG. 1, an input component 20 is located on the upper left region of screen rectangle 10. In this example, input component 20 is a text box control in which an end user would input (typically with a keyboard) alphanumeric text for the purpose of searching a customer database. Within the same screen rectangle 10, an output control or output component 30 is positioned on the far right side of the desktop interface. Output component 30 in this example is a list box with a header and three rows of customer names. It should be noted that the input component 20 may be any other type of GUI component or widget that takes focus to obtain end user interaction. Output component 30 is further intended to include output regions, such as coordinate locations on a GUI in which new content is generated responsive to interaction with input component 20. An example of an output region may include text in a document that is highlighted in response to interaction with a search dialog text box by the end user (e.g., the input component or input control). Input control and input component may be used interchangeably. Output control, output component, output region and a related object (with respect to the input control) may be used interchangeably. As shown in FIG. 1, the input component 20 and output component 30 are both displayed on the unmagnified screen. If both are not clipped but completely visible on the screen, bounding rectangle 40 enclosing both objects must be smaller than the unmagnified screen rectangle.

Figure 2:
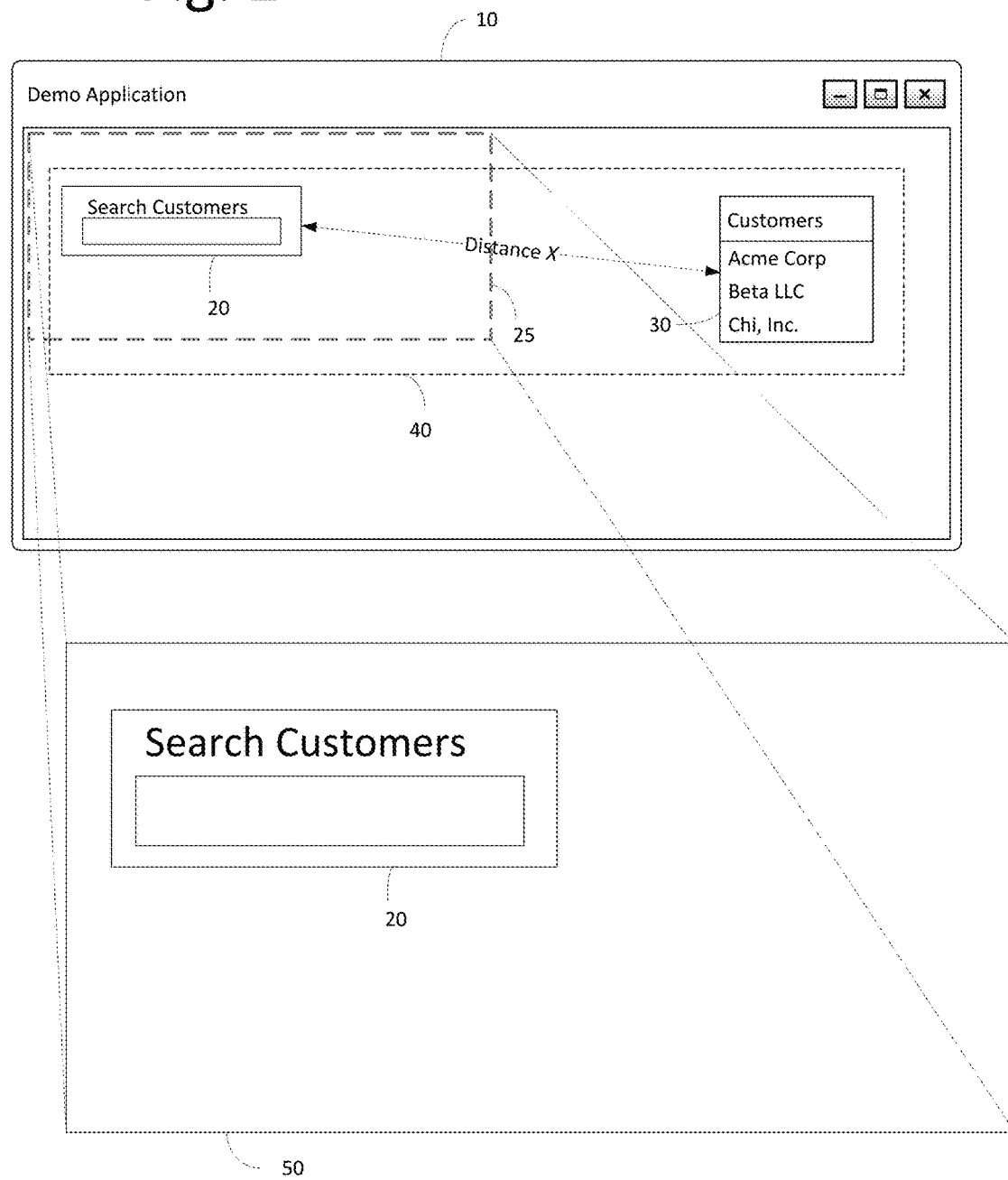
FIG. 2 is a conceptual view of a desktop graphic user interface showing both an unmagnified view of the entire desktop GUI and a magnified, primary view port of an area around the input component.

FIG. 2 shows the unmagnified screen rectangle 10 at the top and a magnified view 50 below showing an enlarged view of input component 20. In the magnified view the source rectangle 25 that can be displayed becomes smaller as the magnification level increases. At some point the bounding rectangle 40 becomes bigger than the source rectangle 25 and the two objects can no longer be displayed in a single view without rearranging the display.

Figure 3:
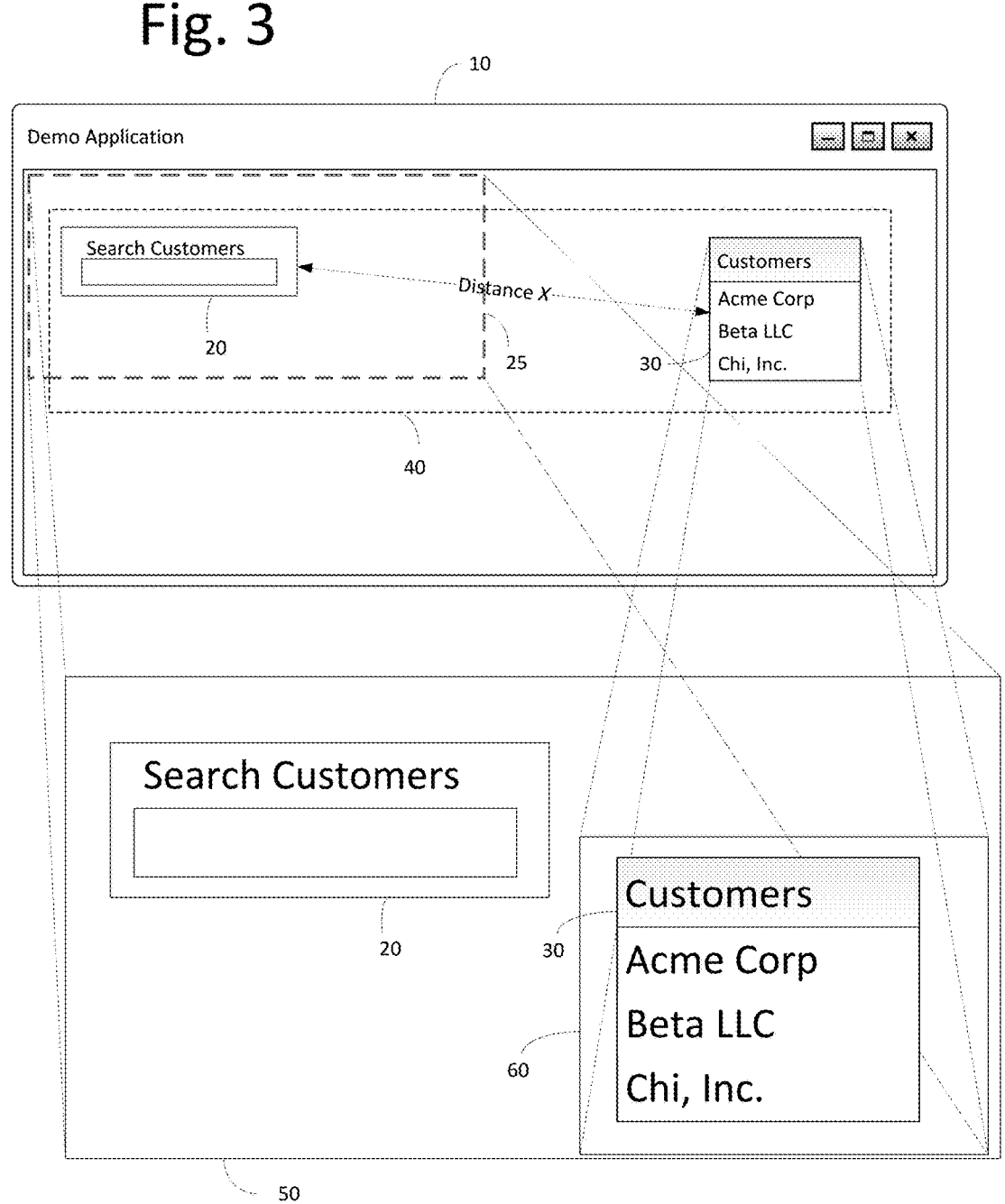
FIG. 3 is a conceptual view of a desktop graphic user interface showing an unmagnified view of the entire desktop GUI and a magnified view of the input component area in the primary view port and a secondary view port showing a magnified output region.

By using a secondary view port 60 in FIG. 3 that has the location of the output component 30 or related object as source and is composed on top of the primary view port 50, it is possible to display both objects within the same view port.

Figure 4:
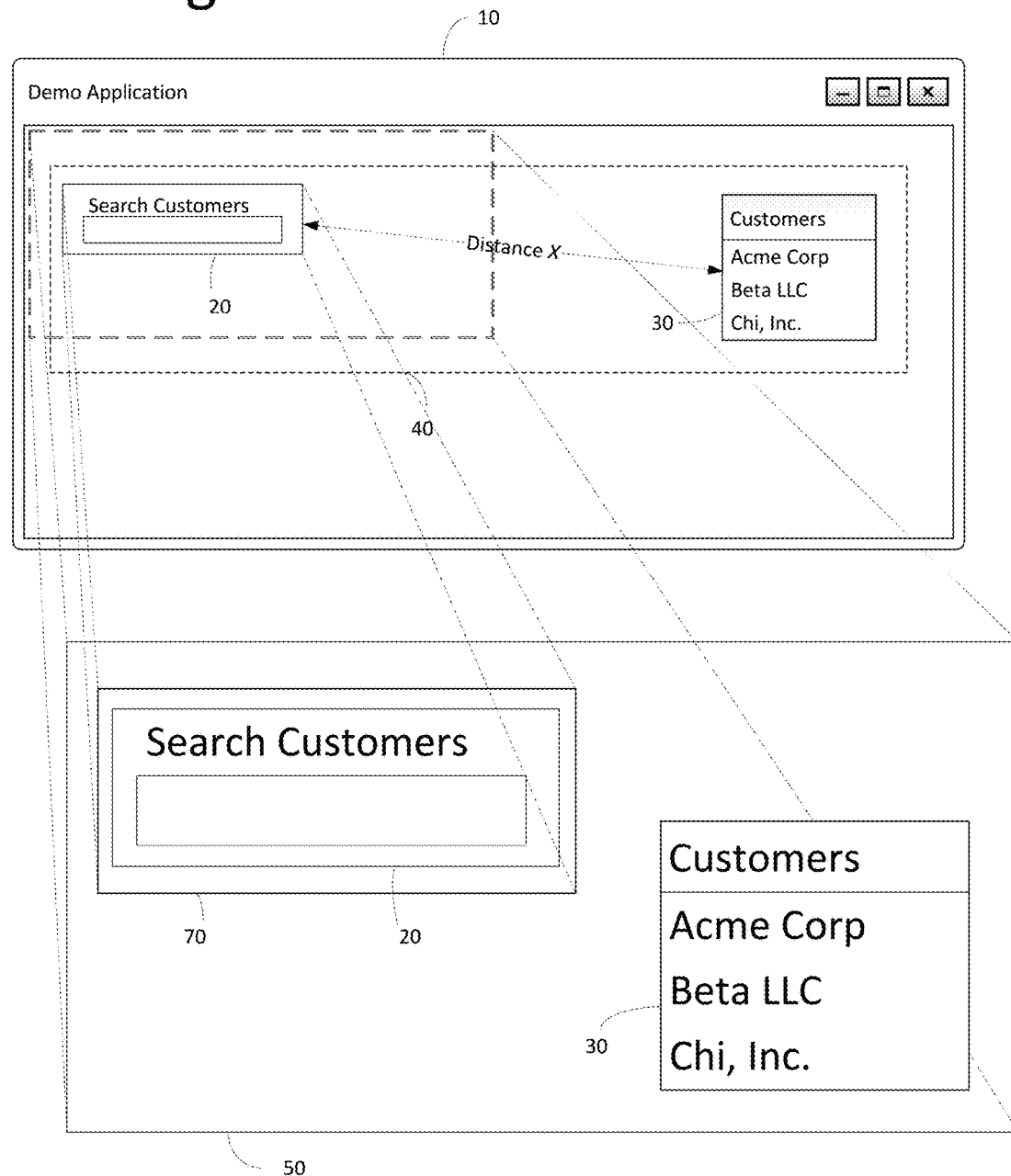
FIG. 4 is a conceptual view of a desktop graphic user interface showing an unmagnified view of the entire desktop GUI and a magnified view of the output region area in the primary view port and a secondary view port showing a magnified input component.

In an embodiment of the invention shown in FIG. 4, the end user may issue a command to switch which object is in the main 50 and which in the secondary view port 70. This allows the user to interact with the output component 30 or related object.

Figure 5:
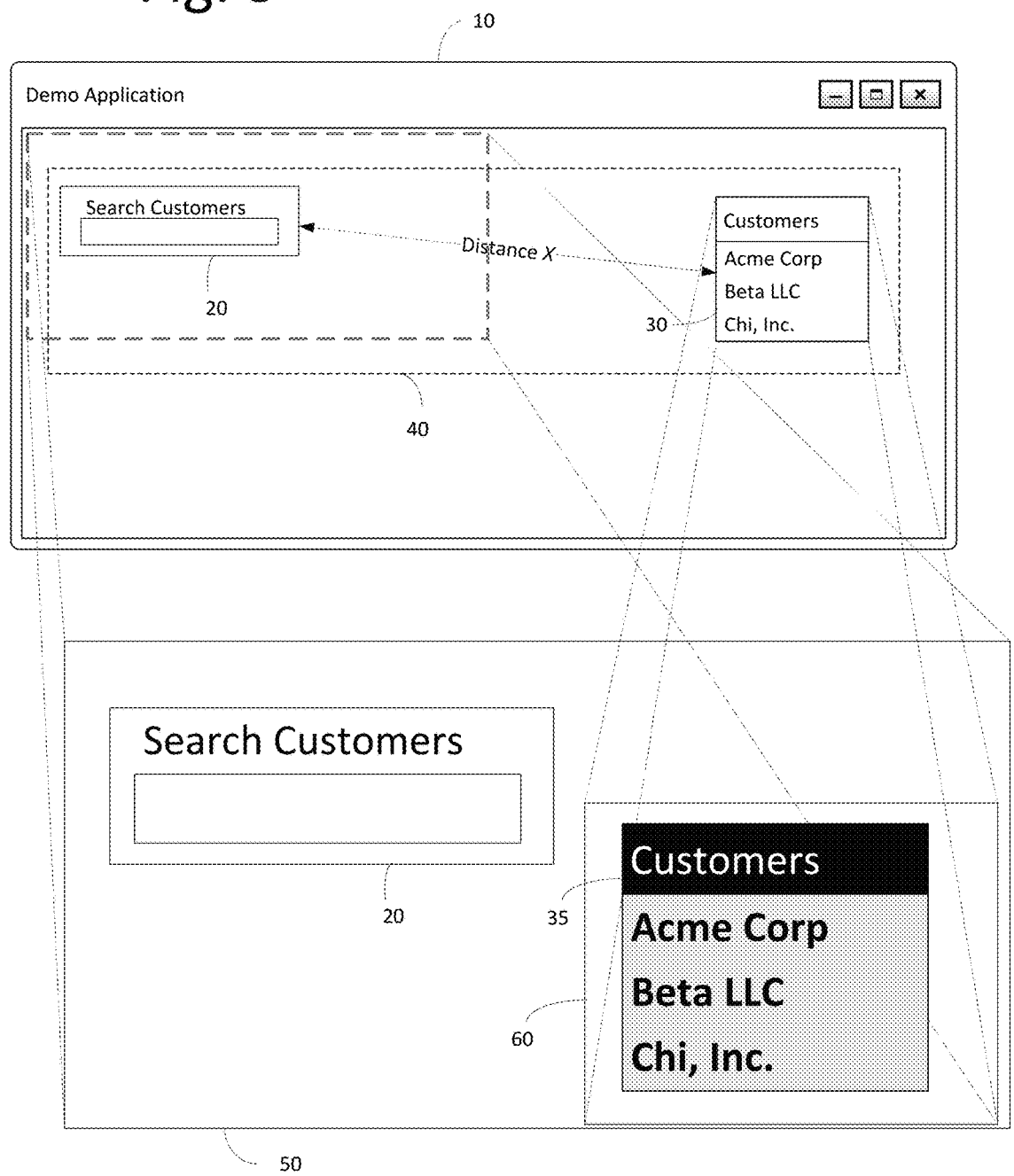
FIG. 5 is a conceptual view of a desktop graphic user interface showing both an unmagnified view of the entire desktop GUI and a magnified view including a rendered output region component in a secondary view port.

In FIG. 5 the source location of the output component 30 is used to determine the content, specifically the text, within that location (using an off-screen model or using for example OCR). The content is than rendered within the secondary view port 60 using custom background and foreground styles and fonts.

Figure 6:
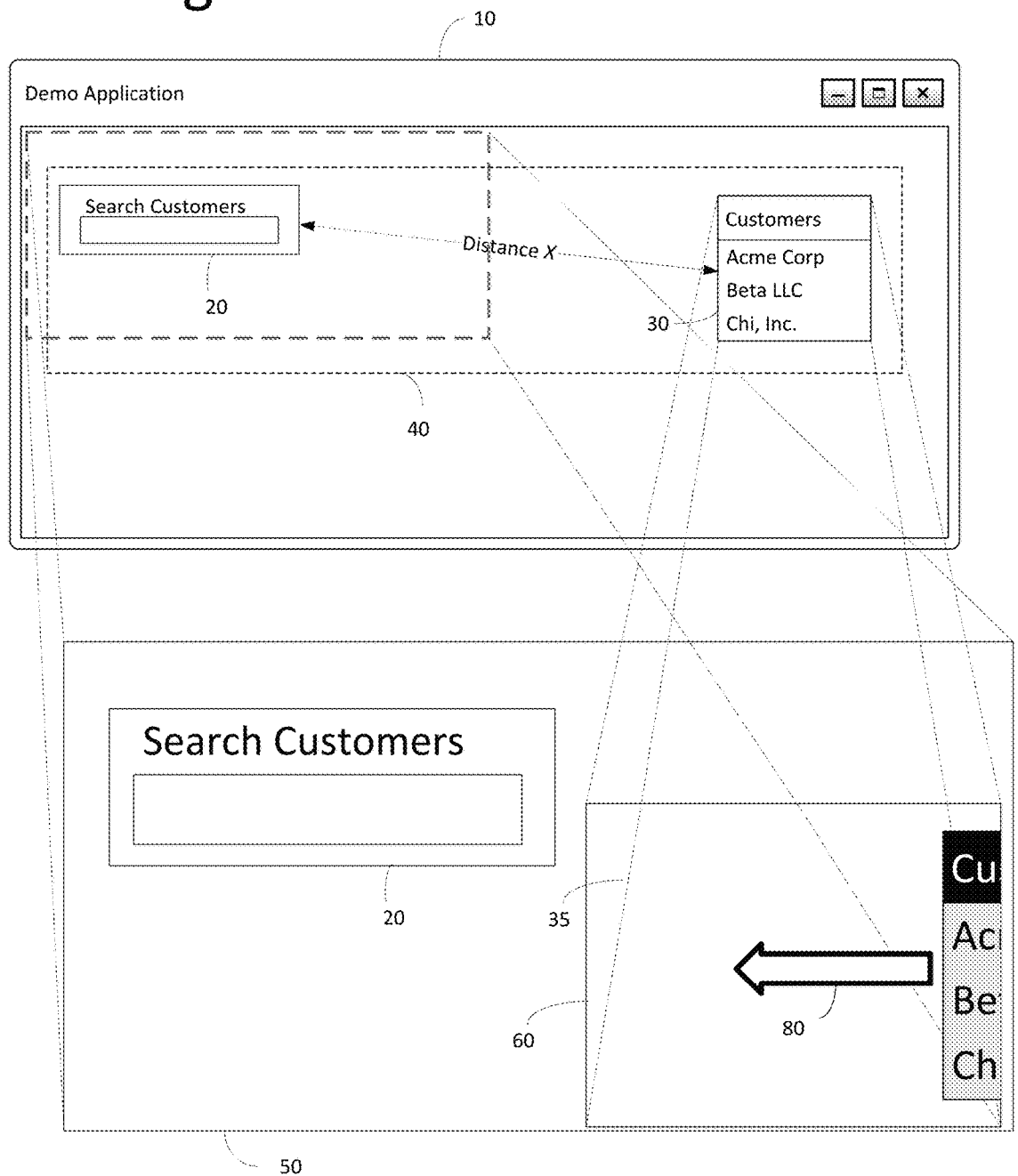
FIG. 6 is a conceptual view of a desktop graphic user interface showing both an unmagnified view of the entire desktop GUI and a magnified view including a rendered output region component in a secondary view port brought into view by a sliding animation.

In FIG. 6 after the input component 20 (or input object) received focus, the output component 30 is brought into view using an animation path 80. In this figure the animation path 80 is sliding the secondary view port 60 from the right side of the screen to its final location. Other animations include fading in, zooming up and the like.

Figure 7:
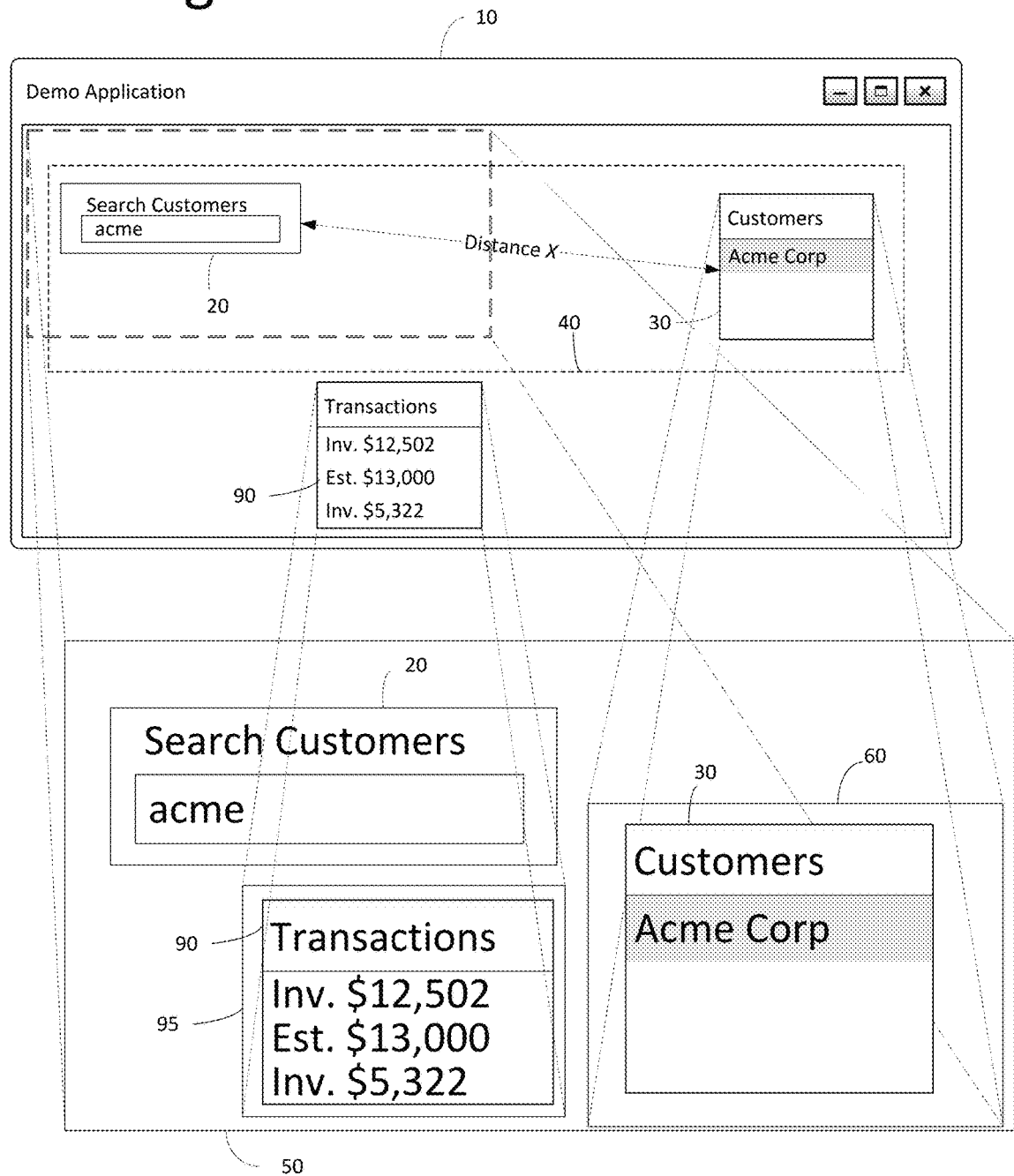
FIG. 7 is a conceptual view of a desktop graphic user interface showing an unmagnified view of the entire desktop GUI and a magnified view of the input component area in the primary view port, a secondary view port showing a magnified first output region, and a tertiary view port showing a magnified second output region.

In FIG. 7, two secondary viewports 60 and 95 are displayed for the two output components 30 and 90 respectively. These two output component may be displayed along with the input component 30 within the magnified view. In the example shown, an end user entered a text string for "acme" within input component 20. This queried a database of companies and filtered the list box output control 30 to a single record, "Acme Corp." Responsive to that result, second output component 90 in the form of another list box returns a query of transaction items related to "Acme Corp."

Figure 8:
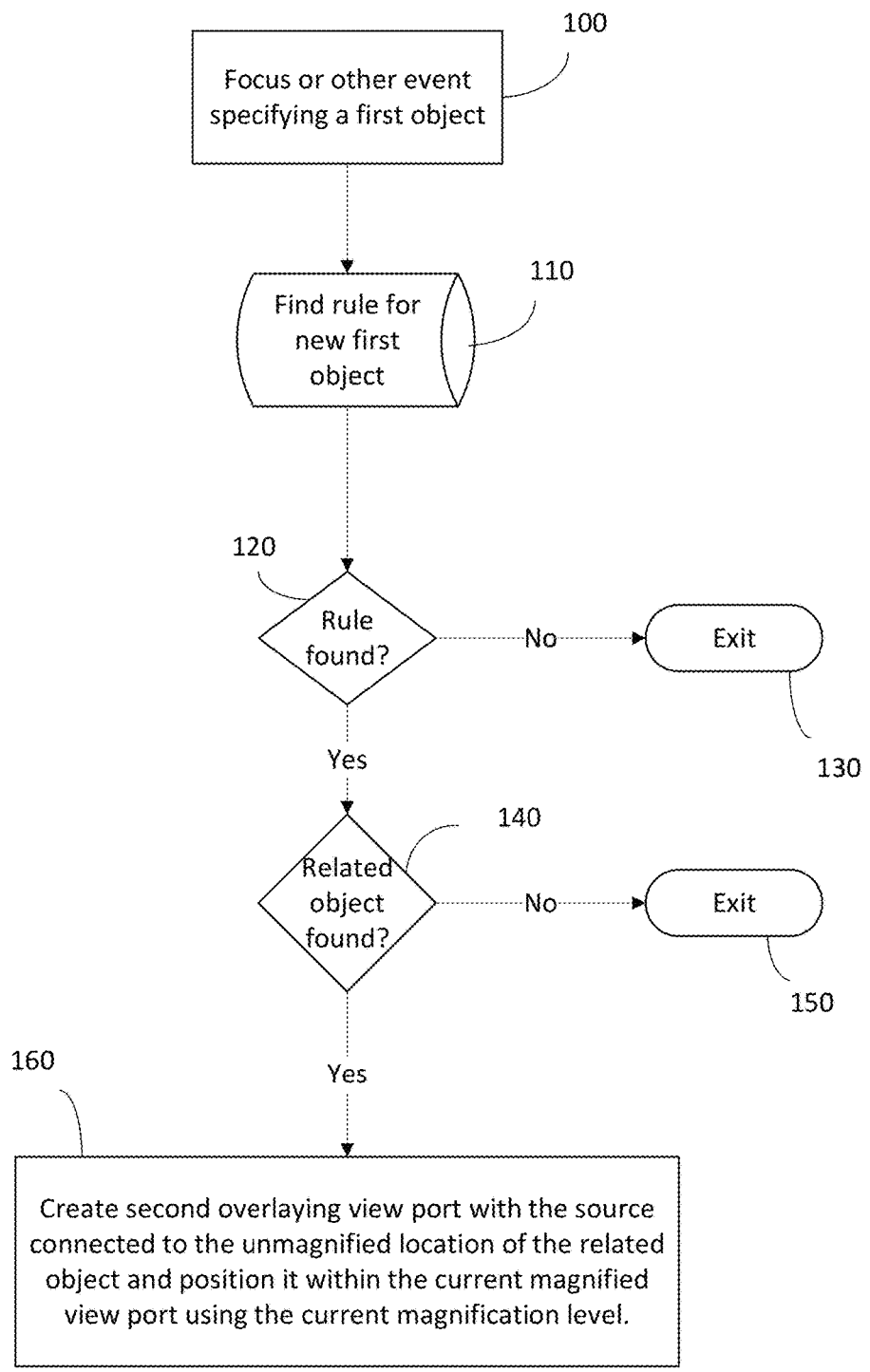
FIG. 8 is a flow chart process showing event triggering causing a rules engine to display both objects (e.g., input component and output region or output component).

In a logical diagram of an embodiment of the invention shown in FIG. 8, the rules engine should always be triggered by an event 100. The most obvious event is the focus event, but other events might be necessary to be monitored like state change and text change events. The event is triggered for a specific object. In most cases this first object is an input control of some sort. The rules engine needs to search 110 for a rule for this specific object. If a rule for the specific object is found 120, the rules engines needs to contain data and/or code to find the related object (e.g., the output component or output region) and the screen location of this object. Once the related object is found 140 and its screen location and size is known. A secondary magnified view port needs to be created 160. The secondary view port needs to use the screen location of the related object as source and it needs to be placed within the magnified view port alongside the first or input object.

Figure 9:
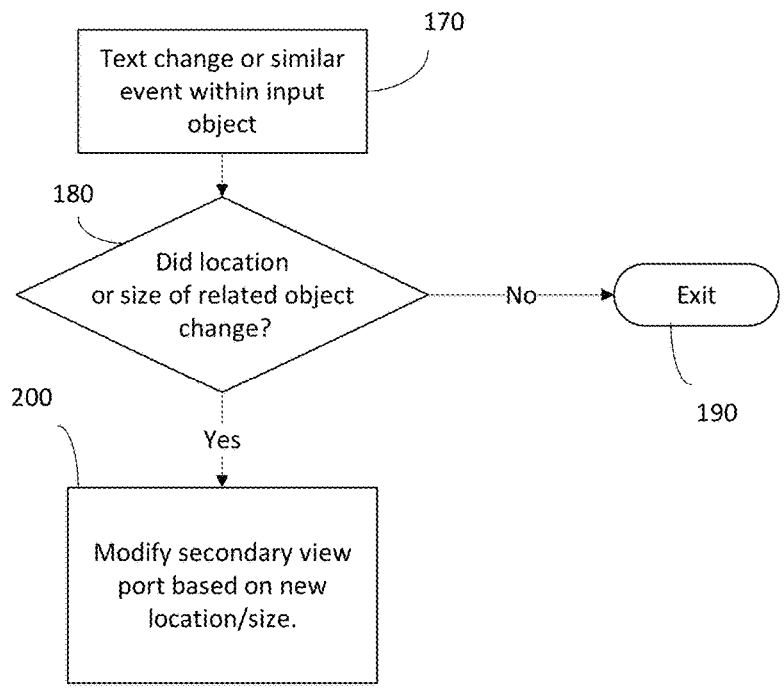
FIG. 9 is a flow chart process which shows handling of a second event within the first or input object, that might change the location or size of the second or related object.

In FIG. 9 after the second or related object is initially identified, events within the first or input event are monitored 170 to be able to adjust 200 the secondary view port in case the size or location of the second or related object change 180.

Figure 10:
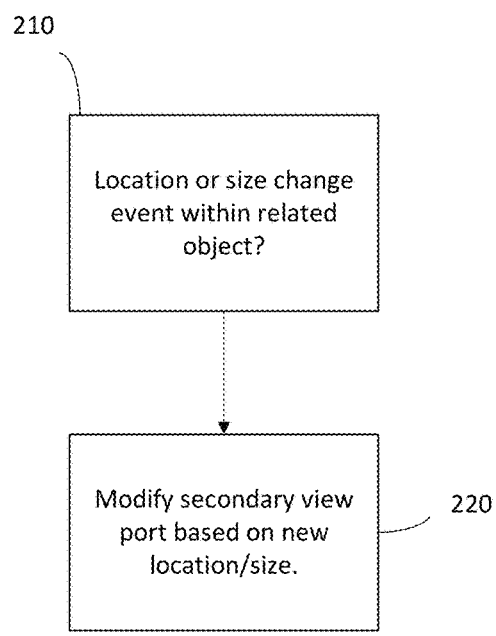
FIG. 10 is a flow chart process which shows handling of an event within the second or related object, that changes its size or location.

In FIG. 10, after the second or related object is initially identified, events within the second or related object are monitored 210 in order to adjust 220 the secondary view port in case the size or location of the second or related object changed.

Figure 11:
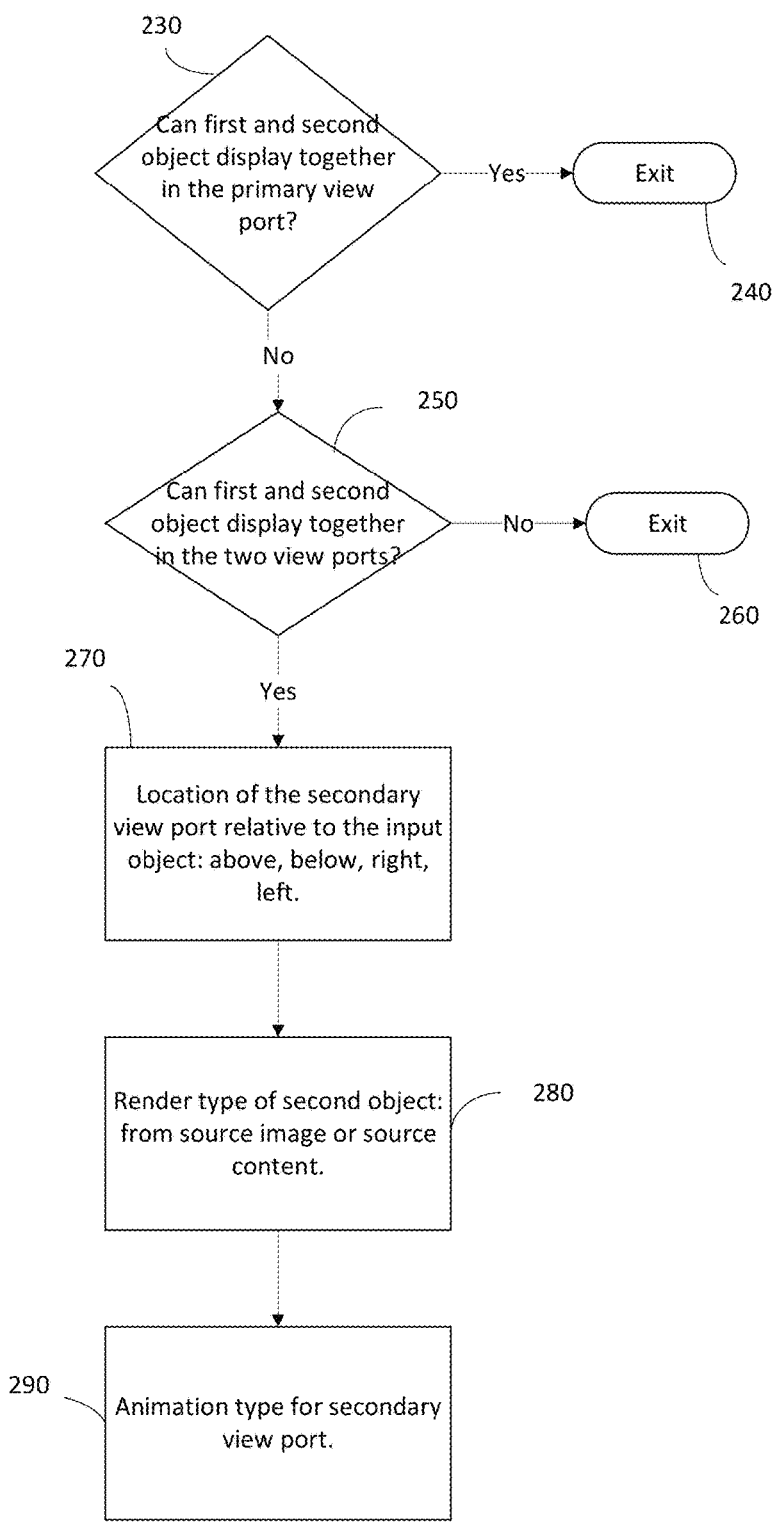
FIG. 11 is a flow chart process which shows the decisions to render the second or related object within the secondary view port.

In FIG. 11 once the second or related object is identified it has to be determined if and how to render a secondary view port and the second or related object within it. A first decision 230 should be made not to show the secondary view port if the second or related object is already visible within the primary view port together with the first or input object. This is typically the case for low magnification levels. A second decision 250 should be made not to show the secondary view port if the secondary view port would in any form overlap or obscure the first or input object. This is typically the case for high magnification levels. A third decision 270 has to be made, where to place the secondary view port relative to the first or input object. Typically, it could be placed above, below, to the right or to the left.

A fourth decision 280 has to be made, how to render the second or related object within the secondary view port. This could be either be based on the source image (see FIG. 3) or based on the content (see FIG. 5).

A fifth decision 290 has to be made, how to animate the appearance of the secondary view port (see FIG. 6). This could be none, slide, fade in, zoom up and so on.

Microsoft Active Accessibility (MSAA) is an Application Programming Interface (API) for user interface accessibility. MSAA is designed to help Assistive Technology (AT) products interact with standard and custom user interface (UI) elements of an application (or the operating system), as well as to access, identify, and manipulate an application's UI elements. UI messaging may also be retrieved from additional assistive technology APIs such as IAccessible2 and Java Access Bridge.

Microsoft corporation further provides an accessibility framework for the Microsoft Windows operating system called UI Automation (UIA). UIA is a successor to MSAA. However, for certain events, MSAA may be preferred. UIA provides programmatic access to most user interface (UI) elements on the desktop, enabling assistive technology products such as screen readers, magnification software and the like to provide information about the UI to end users and to manipulate the UI by means other than standard input. For the purposes of this invention, accessing events from UIA is an efficient method to capture key events such as when focus is made on a certain UI component.

Figure 12:
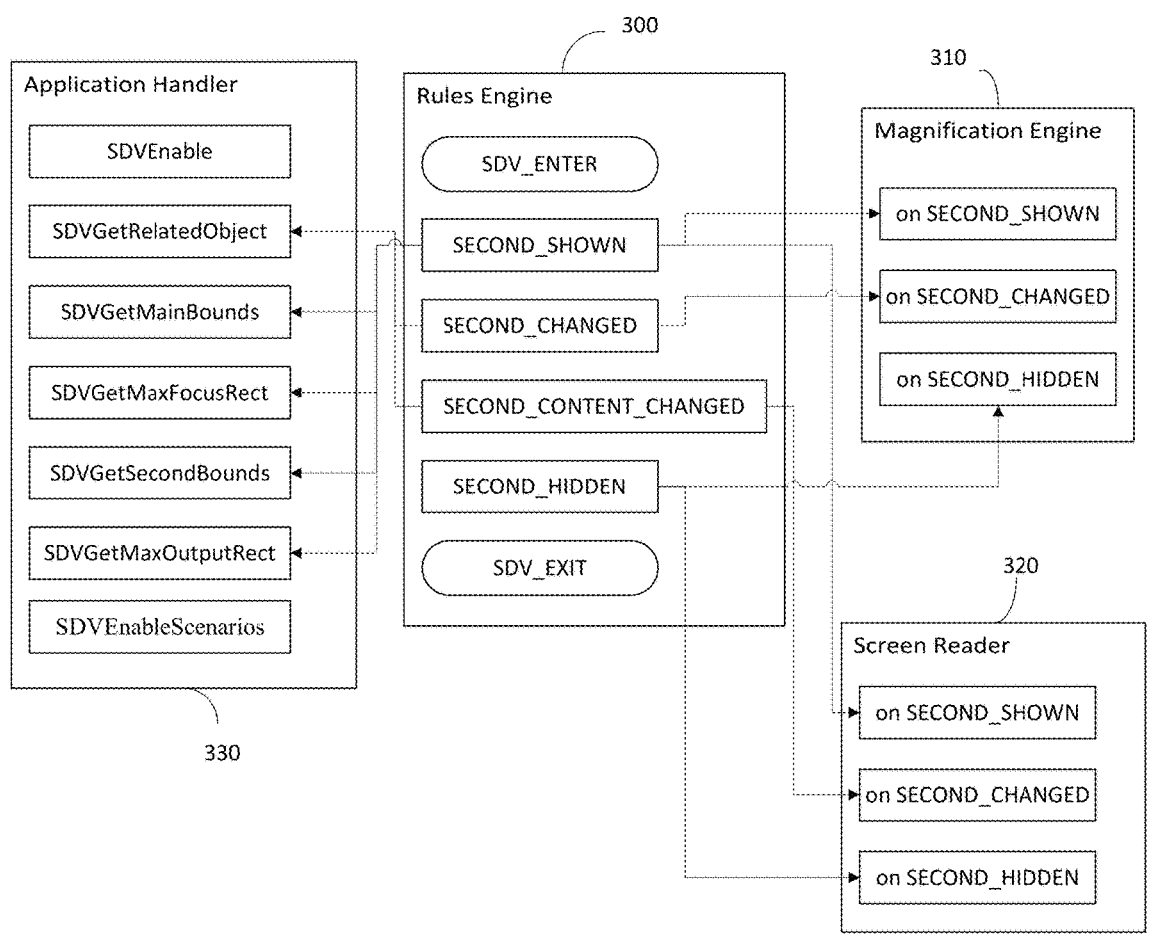
FIG. 12 is a diagrammatic view of messaging flow between a rules engine, magnification engine, screen reader and application handler according to an embodiment of the invention.

In addition to capturing events from UIA and/or MSAA, a rules engine in the present invention fires events to signal magnifier and screen reader applications. This is shown in FIG. 12 where rules engine 300 fires six different events. SDV_ENTER is fired when one of the input controls gets focus. The UIA FocusChanged event is used to identify an input control by process name, control type, window class name and automation id. SECOND_SHOWN is fired when the output control becomes visible. This could be simultaneous with the firing of SDV_ENTER or SECOND_SHOWN may come later. SECOND_CHANGED is fired when the location for the output control has changed. An embodiment of the invention uses MSAA events to detect the location change as there may be too many UIA BoundingRectangle property changed events. SECOND_CONTENT_CHANGED is fired when the text for the output control is changed. UIA TextChanged and UIA TextSelection changed events are used to track the output control text changed and when output control is shown and hidden automatically. The logic analyzing the text events uses the ValuePattern.Value string instead of getting DocumentPattern.DocumentRange object to enhance performance of the application. SECOND_HIDDEN is fired when the output control is hidden. This is fired prior to SDV_EXIT which is fired when the input controls no longer have focus.

Magnification engine 310 responses to events fired by rules engine 300. For example, on SECOND_SHOWN executes a number of procedures and/or functions including:

1) calls to get the bounding rectangles for input and output controls;
2) calls to get the current focus rectangle;
3) calls to get maximum output and input focus rectangles which is used to determine if the secondary view port needs to be shown or if everything can be displayed together in a magnified, single primary view port;
4) calculate if the secondary view port should be displayed on the top or bottom of the screen;
5) calculate if the primary view port needs to be scrolled (to keep the current focus visible);
6) slide in the secondary view port and scroll the primary view port as needed;
7) change the mouse point to a SDV-specific tool pointer;
8) display the secondary view.

If the SDV window animation property is set to SlideAnimation, when the SDV window is enabled, a separate thread is started that changes SDV window location on display within some period of time (currently 20 ms) and this makes the SDV window slide in (or slide out when disable SDV window). Also animation can be canceled if necessary.

The secondary view is an additional magnification window (like freeze window, or lens window) and has different parameters and properties. To control its location, it has SourceLocation property, the location of 1× area of non-magnified screen (desktop) that should be shown in this window, and a DestinationLocation which is the actual location of SDV window on the display. If the DestinationLocation size is larger than SourceLocation size, the source content in this window is magnified by DirectX and the magnification level is calculated as magLevel=DestinationLocation.Size/SourceLocation.Size.

Magnification engine 310 responds to on SECOND_CHANGED by updating the source location for the secondary view port. It may also use mouse hooks to determine whether the end user mouse has moved. If the mouse moves out of the input boundaries then the second view port is removed or slid out of view. Alternatively, if the mouse moves back in the input boundaries, then the second view port reappears or is slide back into view. In response to on SECOND_HIDDEN, magnification engine 310 slides out the secondary view port.

Like the magnification engine 310, screen reader 320 also responds to events fired by rules engine 300. In response to on SECOND_SHOWN, screen reader 320 may announce the SDV mode is active and/or optionally announce the text within the output control. In response to on SECOND_CONTENT_CHANGED, screen reader 320 may optionally announce the text within the output control. Finally, in response to on SECOND_HIDDEN, screen reader 320 may optionally announce existing of the SDV mode.

In addition to the rules engine 300, magnification engine 310 and screen reader 320, application handler 330 invokes a number of methods in response to events. For example, handler 330 invokes SDVEnable on startup of the magnification software to enable SDV features. SDVGetRelatedObject is called responsive to SECOND_SHOWN, SECOND_CHANGED and SECOND_CONTENT_CHANGED as well as when the end user executes the "Say Output Text" command. SDVGeTMainBounds, SDVGetMaxFocusRect, SDVGetSecondBounds and SDVGetMaxOutputRect are all called responsive to SECOND_SHOWN and used to determine where and how a secondary view port may appear or whether it may appear at all. Finally, SDVEnableScenarios is called from a dialog box (FIG. 13) to enable or disable known SDV scenarios.

Figure 13:
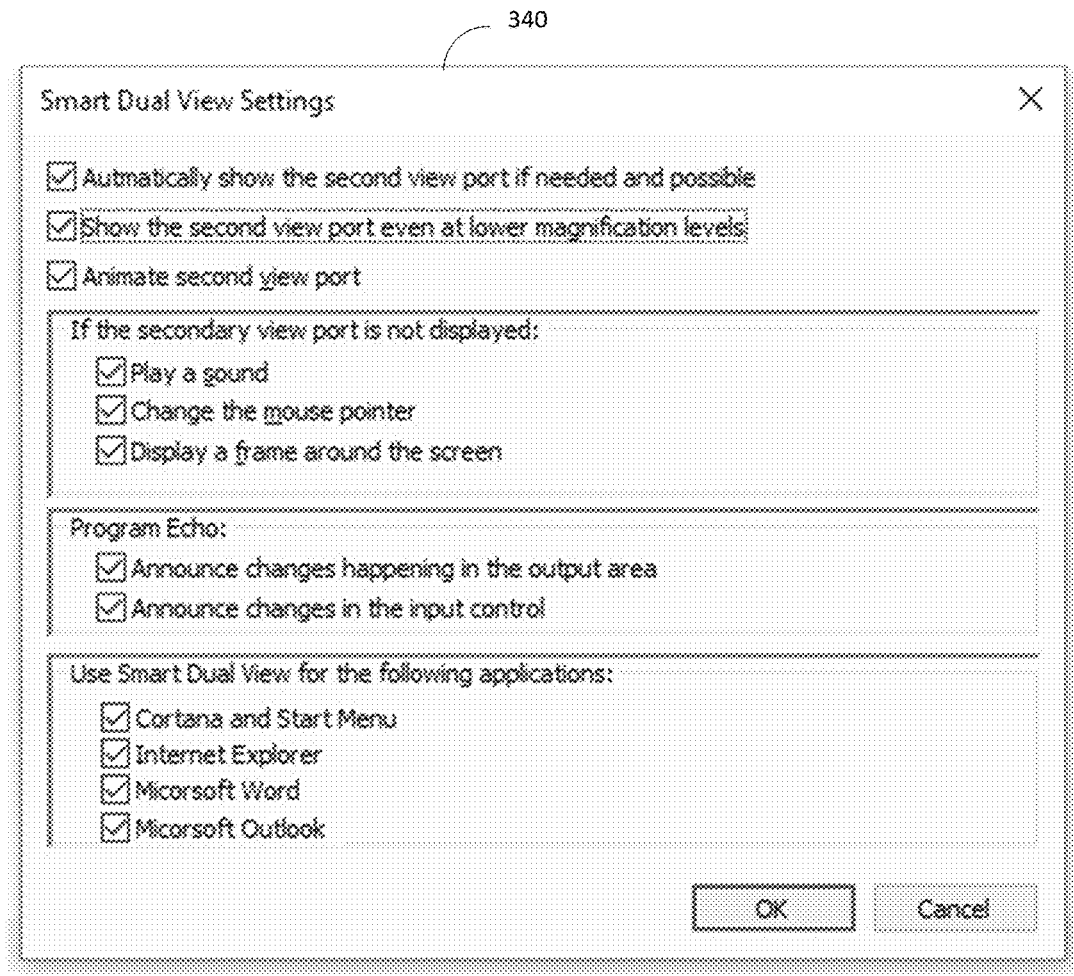
FIG. 13 is a modal dialog interface for configuring settings according to an embodiment of the invention.

FIG. 13 shows a dialog box 340 with checkboxes to enable or disable SDV settings. The check box "Automatically show the second view port if needed and possible" is checked by default. If not checked only indicators are used. The check box "Show the second view port even at lower magnification levels" is on by default. If checked, the second view port is displayed on all magnification levels up to the point where it no longer can be displayed along the input control. If not checked the secondary view port is only displayed if the magnification level is high enough the input and output region no longer can be displayed in a single view.

The check box "Animate second view port" is on by default. If checked the view port slides in and out. If not checked the view port will appear and disappear without animation. It should be noted other types of animations and visual effects are anticipated such as fades, wipes, and the like.

Group "if the Secondary View Port is not Displayed:"

The check box "Play a sound" is on by default and provides an audible indicator if the secondary view port is not displayed. The check box "Change the mouse pointer" is on by default and changes the pointing indicia when the secondary view port is not displayed. The check box "Display a frame around the screen" is on by default and the frame appears when the secondary view port is not displayed.

Group "Program Echo":

The check box "Announce changes happening in the output area" is on by default. The check box "Announce changes happening in the input control" is on by default.

Group "Use Smart Dual View for the Following Applications:"

This is a list of checkboxes for each application with Smart Dual View defined. All are checked by default.

Hardware and Software Infrastructure Examples

The present invention may be embodied on various computing platforms that perform actions responsive to software-based instructions and most particularly for low-vision user magnification software. These include both traditional desktop and notebooks devices and also smartphones and tablets. Smartphones and tablets often have less resolution and smaller screen areas than desktop systems. This makes this invention particularly useful in view of the limitations of portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to certain statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic, Objective C, Python or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Active view port—the view port that receives keyboard and mouse input. This is almost always intended to be the primary view port.

Animation—includes any visual effects such as dynamic movement, color changes, and opacity, particularly in relation to presenting secondary and tertiary view ports to the end user. Animation cycle speed is typically measured in milliseconds with a typical range between 20 and 3,000 milliseconds.

Components—are elements on the graphic user interface that facilitates specific user-computer interaction. Components include, but are not limited to, buttons, menus, links, tabs, scrollbars, labels, check boxes, radio buttons, sliders and spinners.

Display monitor—is an electronic visual display for computers that is capable of presenting a graphic user interface to an end user.

End user—is an operator of the magnification software with no access to modify the source code of the magnification software.

Focus—indicates the component of the graphical user interface which is selected to receive input. Text typed at the keyboard or pasted from a clipboard is sent to the component which has the focus. Typically, the focus is withdrawn from a component by giving another component the focus.

Graphic User Interface (GUI)—is a type of user interface that allows users to interact with computer devices through icons and visual indicators, instead of text-based user interfaces, typed command labels or text navigation.

Input component—one or more control the user interacts with to generate input—search edit box, next and previous buttons, keys on the on-screen keyboard. Input component is used interchangeably with input control.

Primary view port—the default view port, that is without Smart Dual View the only view port, this view port displays the magnified input control.

Messaging (operating system)—includes function calls, messages, or events passed between software components and capable of being intercepted by the claimed magnification software. Code that handles such intercepted function calls, events or messages is called a "hook." Microsoft Windows for example, allows you to insert hooks that can be used to process or modify system events and application events for dialogs, scrollbars, and menus as well as other items. It also allows a hook to insert, remove, process or modify keyboard and mouse events.

Output component—a component or widget that changes visual state responsive to interaction with the input component.

Output region—either a static (for example Windows operating system calculator application) or a variable location (for example Microsoft Word search) with changing content based on the input controls.

Related object—is substantially analogous to an output component which changes responsive to interaction with the input component or input object.

Rules engine—an engine that in the initial release processes a list of predetermined decisions about input controls and matching output regions.

Screen magnification software—interfaces with a computer's graphical output to present enlarged screen content. A well-known screen magnification software application is sold under the ZOOMTEXT brand.

SDV mode—a specific state the screen magnification software enters once the focus is set to a supported input control.

Secondary view port—the additional view port created by the Smart Dual View feature displaying the magnified output region.

Smart Dual View—refers to this invention generally, namely generating a plurality of magnified view ports responsive to monitoring focus events on a computer operating system.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of automatically presenting magnified view ports of an in-focus input control and a responsive output region on a graphic user interface presented on a display monitor, the method comprising the steps of:

displaying the graphic user interface on the display monitor, the graphic user interface having an input control and a corresponding output region, the input control and the output region belonging to a software application;

accessing a rule corresponding to the software application, the rule assigned to the input control and the output region, wherein the output region displays alphanumeric output generated responsive to an end user interaction with the input control;

monitoring operating system events indicating that the software application put focus on the input control assigned to the rule;

intercepting messaging between an operating system and the software application, the messaging indicating the input control assigned to the rule has focus;

displaying on the display monitor a primary view port showing the input control at a first magnification level wherein the end user interacts with the input control by inputting alphanumeric characters in the input control;

intercepting messaging between the operating system and the software application indicating a change of the alphanumeric output to be displayed in the output region assigned to the rule as a result of the end user interaction with the input control;

responsive to detecting the change in the alphanumeric output to be displayed within the output region, launching a secondary view port displaying the output region by bringing the secondary view port into view, thereby simultaneously displaying on the display monitor the primary view port displaying the input control and the secondary view port displaying the output region, the output region depicting the alphanumeric output generated responsive to the end user interaction with the input control displayed in the primary view port, whereby the input control in the primary view port remains in focus.

2. The method of claim 1 wherein the step of bringing the secondary view port into view includes the further step of sliding the secondary view port into view with an animation duration between 20 to 3,000 milliseconds.

3. The method of claim 1 wherein the secondary view port temporarily overlaps the primary view port responsive to the change of the output region responsive to the end user interaction with the input control.

4. The method of claim 1 further comprising the step of monitoring mouse-pointer movements within the primary view port and responsive to the mouse-pointer location moving a predetermined distance away from the input control, closing the primary and secondary view ports.

5. The method of claim 1 further comprising the step of reducing the size of the primary view port responsive to the display of the secondary view port whereby both view ports are simultaneously visible on the display monitor.

6. The method of claim 1 further comprising the steps of:
retrieving from the operating system the current resolution of the display monitor displaying the graphic user interface;
calculating under the first magnification level whether the input control and the output region are fully visible within the primary view port; and
displaying the secondary view port only if both the input control and output region are too large or too distant on the graphic user interface to be displayed together within the primary view port.

7. The method of claim 6 further comprising the steps of:
responsive to an increase of magnification level by the end user while displaying both the input control and the output region within the primary view port, the increased magnification level now exceeding the ability to display the input control and the output region simultaneously within the primary view port, displaying the input control in the primary view port and displaying the output region in the secondary view port.

8. The method of claim 6 further comprising the steps of:
responsive to a decrease of magnification level by the end user while displaying the input control in the primary view port and the output region within the secondary view port, the decreased magnification level now enabling the ability to display the input control and the output region simultaneously within the primary view port, closing the secondary view port and displaying the input control and the output region together in the primary view port.

9. The method of claim 1 further comprising the steps of:
creating an array of input control and output region rules, each rule assigned to a software application and at least one input control and at least one output region;
monitoring operating system events fired response to a software application putting focus on at least one input control found in the rule;
automatically centering a primary view port upon the input control;
automatically displaying a secondary view port for the output region;
further monitoring operating system events for when focus is lost from the input control; and
automatically closing the primary and secondary view ports responsive to loss of focus of the input control.

10. The method of claim 1 further comprising the step of displaying on the graphic user interface the primary view port and the secondary view port in analogous, coordinate relation to the relative location of the input control and the output region as displayed on an unmagnified graphic user interface.

11. The method of claim 1 further comprising the step of assigning keyboard commands to pan only the secondary view port wherein the output region is displayed.

12. One or more non-transitory tangible computer-readable media having computer-executable instructions for performing a method, the computer operating under an operating system, the operating system displaying a graphic user interface on a displaying monitor, the graphic user interface having one input control and one output region, the input control and the output region belonging to a software application, comprising:
accessing a rule corresponding to the software application, the rule assigned to the input control and the output region, wherein the output region displays alphanumeric output generated responsive to an end user interaction with the input control;
monitoring operating system events indicating that the software application put focus on the input control assigned to the rule;
intercepting messaging between the operating system and the software application indicating the input control assigned to the rule has focus;
displaying on the display monitor a primary view port showing the input control at a first magnification level wherein the end user interacts with the input control by inputting alphanumeric characters in the input control;
intercepting messaging between the operating system and the software application indicating a change of the alphanumeric output to be displayed in the output region assigned to the rule as a result of the end user interaction with the input control;
responsive to detecting that the alphanumeric output of the output region has changed, launching a secondary view port displaying the output region by bringing the secondary view port into view, thereby simultaneously displaying on the display monitor the primary view port displaying the input control and the secondary view port displaying the output region, the output region depicting the alphanumeric output generated responsive to the end user interaction with the input control.

13. The one or more non-transitory tangible computer-readable media of claim 12 wherein the output region is defined by a single output control.

14. The one or more non-transitory tangible computer-readable media of claim 13 wherein the single output control is selected from a group consisting of a single line text box control, a multiline text box control, a rich text control, a list box control, a dropdown list control, a table control, a bullet list control, a checkbox list control, a radio button list control, a list view control, a grid view control and a chart control.

15. The one or more non-transitory tangible computer-readable media of claim 12 wherein the secondary view port temporarily overlaps the primary view port responsive to the change of the output region responsive to the end user interaction with the input control.

16. The one or more non-transitory tangible computer-readable media of claim 12 further comprising instructions for monitoring mouse-pointer movements within the primary view port and responsive to the mouse-pointer location moving a predetermined distance away from the input control, closing the primary and secondary view ports.

17. The one or more non-transitory tangible computer-readable media of claim 12 further comprising instructions for reducing the size of the primary view port responsive to the display of the secondary view port whereby both view ports are simultaneously visible on the display monitor.

18. The one or more non-transitory tangible computer-readable media of claim 12 further comprising instructions for:

retrieving from the operating system the current resolution of the display monitor displaying the graphic user interface;

calculating under the first magnification level whether the input control and the output region are fully visible within the primary view port; and displaying the secondary view port only if both the input control and output region are too large or too distant on the graphic user interface to be displayed together within the primary view port.

19. The one or more non-transitory tangible computer-readable media of claim 18 further comprising instructions wherein responsive to an increase of magnification level by the end user while displaying both the input control and the output region within the primary view port, the increased magnification level now exceeding the ability to display the input control and the output region simultaneously within the primary view port, displaying the input control in the primary view port and displaying the output region in the secondary view port.

20. The one or more non-transitory tangible computer-readable media of claim 18 further comprising instructions wherein responsive to a decrease of magnification level by the end user while displaying the input control in the primary view port and the output region within the secondary view port, the decreased magnification level now enabling the ability to display the input control and the output region simultaneously within the primary view port, closing the secondary view port and displaying the input control and the output region together in the primary view port.

21. The one or more non-transitory tangible computer-readable media of claim 12 further comprising instructions for:

creating an array of input control and output region rules, each rule assigned to a software application and at least one input control and at least one output region;

monitoring operating system events fired response to a software application putting focus on at least one input control found in the rule;

automatically centering a primary view port upon the at least one input control;

automatically displaying a secondary view port for the at least one output region;

further monitoring operating system events for when focus is lost from the at least one input control; and automatically closing the primary and secondary view ports responsive to loss of focus of the at least one input control.

22. The one or more non-transitory tangible computer-readable media of claim 12 further comprising instructions for displaying on the graphic user interface the primary view port and the secondary view port in analogous, coordinate relation to the relative location of the input control and the output region as displayed on an unmagnified graphic user interface.

23. The one or more non-transitory tangible computer-readable media of claim 12 further comprising instructions for assigning keyboard commands to pan only the secondary view port wherein the output region is displayed.

24. One or more non-transitory tangible computer-readable media having computer-executable instructions for performing a method, the computer operating under an operating system, the operating system displaying a graphic user interface on a displaying monitor, the graphic user interface having one input control and one output control comprising an output region, the input and output controls belonging to a software application, comprising:

establishing a rules engine corresponding to the input and output control, the rules engine communicatively coupled to messaging from an operating system assistive technology application programming interface, the rules engine detecting when a pre-identified input control gains focus;

automatically displaying on the display monitor in a primary view port showing the input control at a first magnification level whereby an end user may interacts with the input control by entering alphanumeric characters in the input control;

intercepting messaging between the operating system and the software application indicating alphanumeric output of the output region assigned to the rules engine has changed responsive to an end user interaction with the input control;

responsive to detecting that the alphanumeric output of the output region has changed, launching a secondary view port displaying the output region by bringing the secondary view port into view, thereby simultaneously displaying on the display monitor the primary view port displaying the input control and the secondary view port displaying the output region, the output region depicting the alphanumeric content generated responsive to the end user input;

detecting from the operating system assistive technology application programming interface when the input control loses focus; and automatically closing both the primary and secondary view ports responsive to the loss of focus of the input control.

25. The one or more non-transitory tangible computer-readable media of claim 24 further comprising instructions to establish a mouse pointer boundary for the primary view port; monitor from operating system messages the location of the end user mouse pointer location; and responsive to the end user mouse pointer location moving outside the mouse pointer boundary automatically closing the primary and secondary view ports.

* * * * *